Aug. 10, 1965  H. BRADLEY  3,199,910
GRAPPLE AND CONTROL THEREFOR
Filed Jan. 30, 1963

INVENTOR
Harvey Bradley
BY Spencer, Rockwell & Bartholow
ATTORNEYS

United States Patent Office 3,199,910
Patented Aug. 10, 1965

3,199,910
GRAPPLE AND CONTROL THEREFOR
Harvey Bradley, Stony Creek, Conn., assignor to
Mansaver Industries, Inc., New Haven, Conn.
Filed Jan. 30, 1963, Ser. No. 254,902
6 Claims. (Cl. 294—88)

This invention relates to material handling devices and more particularly to grapples and controls for grapples having work-engaging jaws arranged to engage and lift an object.

In motor operated grapples the work-engaging jaws are moved toward and away from each other by an electric motor to grasp or release an object therebetween. In one grapple, hereinafter exemplified, the motor, through a suitable transmission, drives a pinion which engages on opposite sides thereof racks defined in grapple arms, having work-engaging jaws depending therefrom. Upon energization of the motor, the pinion, dependent upon its direction of rotation, opens or closes the work-engaging jaws.

To prevent prolonged stalling of the motor and resultant damage thereto when the work-engaging jaws grasp an object, it has been conventional practice to include a slip clutch in the transmission somewhere between the motor shaft and the rack engaging pinion so that when the work-engaging jaws grasp an object, the clutch will slip and prevent the motor from drawing a large stall current for any prolonged period, which might damage the motor.

While use of a slip clutch has been accepted in practice, such use presents several limitations and disadvantages. The grapple operator must always be in a position to detect slipping of the clutch, which limits his freedom of actions. Moreover, the operator must allow the clutch to slip in order to ascertain that the work-engaging jaws have securely engaged the object. This produces wear on the clutch which requires inspection and eventual replacement thereof. In fact, the clutch must usually be replaced several times during the life of the grapple. Such replacement not only adds to maintenance costs, but requires that the grapple be taken out of service for such replacement.

In view of these deficiencies and limitations in motor operated grapples, the present invention provides a motor operated grapple which requires no slip clutches, which ensures positive gripping of an object, which gives the grapple operator more positive control of the grapple and object engaged thereby and which provides a positive and rapid visual indication to show that an object is securely engaged prior to lifting.

Accordingly, it is an object of this invention to provide a new and improved motor operated grapple and control therefor.

Another object of this invention is to provide a new and improved motor control for a motor operated grapple wherein the motor is positively and rapidly de-energized when the grapple securely engages an object.

A further object of this invention is to provide a new and improved motor operated grapple control which enables a grapple operator to more quickly ascertain when an object is engaged thereby providing more efficient handling of the object.

A still further object of the invention is to provide a new and improved motor operated grapple control which gives a grapple operator a positive and visual indication when an object is positively engaged by the grapple so that the object may be immediately hoisted.

Other objects of the invention will in part be obvious and will in part appear hereinafter.

This invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which.

Figure 1:
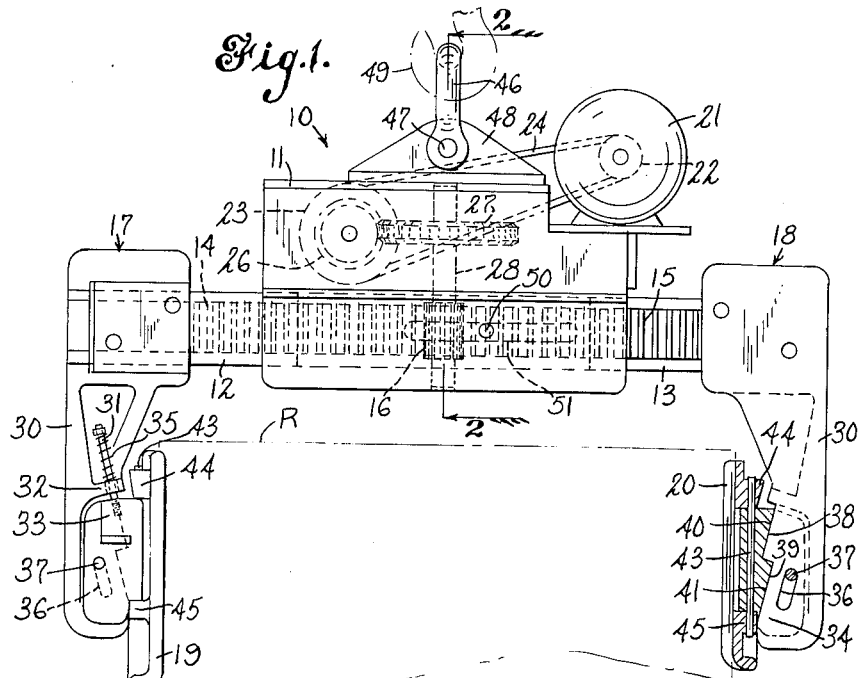
FIG. 1 illustrates a motor operated grapple in which the invention may be incorporated.
Figure 2:
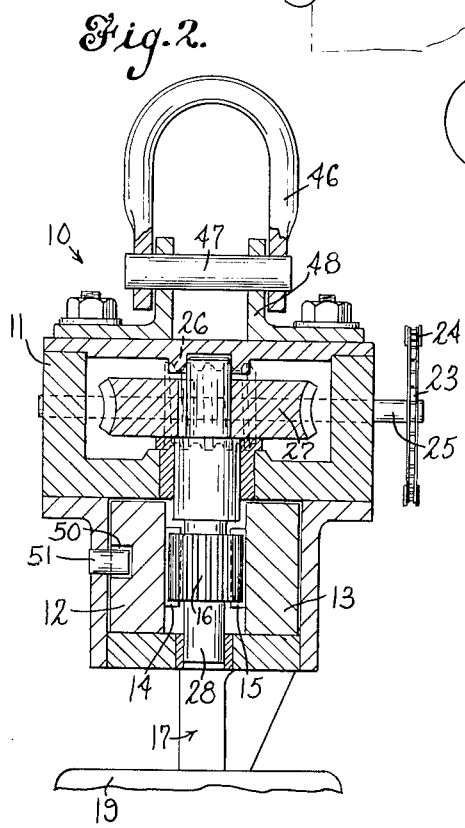
FIG. 2 is a sectional view seen along line 2—2 of FIG. 1.

To illustrate a grapple in which the invention may be embodied, a grapple generally indicated by the reference numeral 10 is shown. Grapple 10 comprises a housing member 11 having grapple arms 12 and 13 movable therein. Each of grapple arms 12 and 13 have racks 14 and 15, respectively, defined thereon which are drivingly engaged by a pinion 16, on opposite sides thereof. Depending from each of grapple arms 12 and 13 are jaw assemblies 17 and 18, respectively. Each of the jaw assemblies 17 and 18 include similar work-engaging jaws 19 and 20, respectively, arranged to engage an object therebetween prior to hoisting thereof.

The grapple 10 includes means for actuating the arms thereof to move the jaws thereof toward and away from each other to engage or release an object positioned therebetwen. The actuating means comprises a motor 21 mounted on housing 11. Motor 21 drives rack engaging pinion 16 by means of a sprocket pinion 22 mounted on the motor shaft and drivingly connected to a sprocket gear 23 by means of a sprocket chain 24. Sprocket gear 23 is mounted on a shaft 25 rotatably carried in housing 11. A pinion 26, also mounted on shaft 25, drives a gear 27 on a shaft 28 upon which pinion 16 is also mounted.

When motor 21 is energized it drives sprocket gear 23 and pinion 26 through sprocket chain 24. Pinion 24 drives gear 27 which produces rotation of shaft 28 and pinion 16 thereon. Rotation of pinion 16, which drivingly engages racks 14 and 15 on grapple arms 12 and 13, respectively, produces movement of the grapple arms in opposite directions to either move the work-engaging jaws 19 and 20 toward each other or away from each other dependent upon the direction of rotation of motor 21. In this manner work-engaging jaws 19 and 20 may be moved toward each other to engage an object, such as a roll of sheet material, on opposite sides thereof prior to lifting of the roll. Where the grapple is designed to pick up rolls, the work-engaging surfaces of the jaws 19 and 20 may be made concave to substantially match the contour of a roll to be lifted.

Each of the jaw assemblies 17 and 18 is arranged to tightly engage a roll as it is lifted by the grapple. Any tendency of a roll to slip between the jaws engaging the roll, acts to tighten the jaws of the jaw assemblies on the slipping roll.

Each of the jaw assemblies 17 and 18 comprises a jaw support member 30 secured to each of grapple arms 12 and 13. A portion of jaw 20 and jaw assembly 18 is cut away to more clearly illustrate the structure of the jaw assemblies. The work-engaging jaws are supported from a jaw support member 30 by means of bolts 31 which extend through a ledge 32 into spaced apart portions 33 of each of jaws 19 and 20, which extend rearwardly thereof on either side of portion 34 of jaw support members 30. Springs 35 are disposed between the heads of bolts 31 and ledge 32 to resiliently support the jaws therefrom.

A slot 36 is provided in portion 34 of jaw support member 30 and a pin 37 movable in slot 36, is carried between spaced apart portions 33. Jaw support portion 34 has parallel inclined surfaces 38 and 39 which slidably mate with parallel inclined surfaces 40 and 41 jaw portions 33. Each of jaw members 19 and 20 is pivotally connected to jaw portions 33 by means of a pin 43 extending therethrough into ears 44 and 45.

This structure of the jaw assemblies 17 and 18 allows the jaws 19 and 20 to move with respect to their associated jaw support members 30 on the mating inclined surfaces therebetween. When such movement occurs, pin 37 moves in slot 36 parallel to inclined surfaces 39 and 40 and acts as a guide and as a limit on downward movement of jaws 19 and 20. Jaws 19 and 20 are allowed to pivot slightly about vertical pins 43 to enable the work-engaging surfaces of jaws 19 and 20 to adjust to the surfaces of an object grasped therebetween. If a roll R, as exemplified in broken line, is tightly engaged between jaws 19 and 20 and the housing 11 is raised to lift roll R, roll R, due to friction between the roll and the work-engaging surfaces of jaws 19 and 20, will exert a downward force on jaws 19 and 20. Jaws 19 and 20 will then move down with respect to inclined surfaces 39 and 40 of jaw support members 30. Such downward motion of jaws 19 and 20 on inclined surfaces 38 and 40 produces inward movement thereof causing the work-engaging surfaces to more tightly engage and grasp roll R on opposite sides thereof.

The grapple 10 is provided with a clevis 46 pivotally mounted on a pin 47 carried in a bracket 48 on housing 11. Clevis 46 is adapted to be engaged by a hook 49 of a crane or other lifting device, not shown, to hoist and lower the grapple and any object grasped thereby.

Grapple 10 is also provided with means to limit the span of jaws 19 and 20 and thereby retain arms 12 and 13 in the housing. A longitudinal slot 50 is defined in one of the arms, arm 12 as illustrated. A pin 51 seated in housing 11 extends into slot 50 and limits outward movement of arm 12. It will be apparent that when pin 51 limits outward movement of arm 12, pinion 16 cannot rotate on rack 14. Therefore, arm 13 cannot be extended and pinion 16 is locked and motor 21 will stall. This is an important feature of construction as will hereinafter be pointed out.

It may be seen that if not otherwise protected motor 21 will stall and draw a high stall current when the jaws 19 and 20 close and engage upon an object to be lifted or open the distance limited by pin 50. Previously, it has been the practice to include a slip clutch in the transmission system previously described or provide limit switches to de-energize the motor when the jaws had been opened a predetermined distance.

Figure 3:
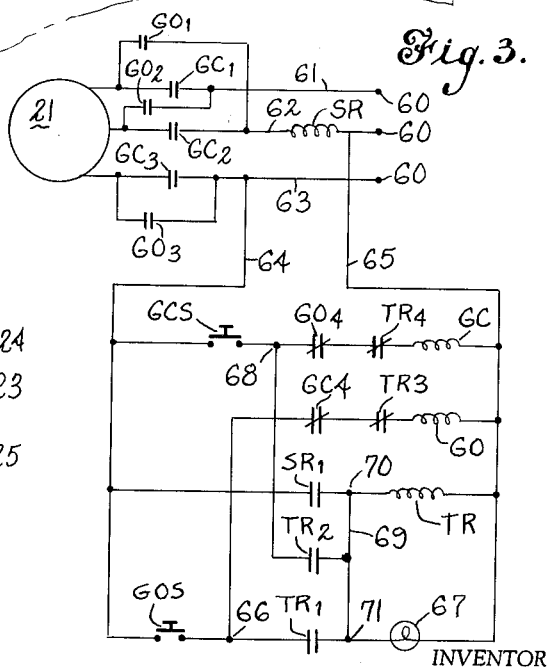
FIG. 3 is a schematic diagram of an electrical control circuit embodying the invention.

In accordance with the invention, new and improved control means are provided to rapidly and positively detect stalling of motor 21 and quickly de-energize the motor when an object is positively engaged by the work-engaging jaws 19 and 20. Motor 21, which is illustrated (FIG. 3) as being of the three-phase induction-type, is arranged to be supplied electric power from a three-phase source, not shown, connectable to terminals 60. Electric power may be supplied to the motor over lines 61, 62 and 63 through grapple close contacts GC1, GC2 and GC3 or grapple open contacts GO1, GO2 and GO3, as hereinafter explained.

The control circuitry exemplified comprises a pair of lines 64 and 65 connected across lines 62 and 63, or other suitable source of electric energy. Contacts GC1, GC2 and GC3 are under control of a grapple close relay GC connected across lines 64 and 65 in series with normally closed contact TR4 and GO4 and grapple close switch GCS. Contacts GO1, GO2 and GO3 are under control of a grapple open relay GO connected across lines 64 and 65 in series with normally closed contacts GC4 and TR3 and grapple open switch GOS. Also, connected in series across lines 64 and 65 is the coil of a relay TR in series with normally open contact SR1, which is controlled by stall current relay SR, in line 62. Connected across lines 64 and 65 in series with switch GOS from terminal point 66 is a visual indicating lamp 67 and a normally open contactor TR1. Connected at terminal point 68 between switch GCS and contact GO4, to line 69 is a normally open contactor TR2. Line 69 is connected at terminal point 70 between contact SR1 and relay TR, and terminal point 71 between contactor TR1 and lamp 67.

To close the work-engaging jaws 19 and 20 on an object to be engaged and hoisted, grapple close switch GCS is closed on its associated terminals thus connecting relay GC between line 64 and 65. When relay GC is energized, contacts GC1, GC2 and GC3 are picked up, thus energizing motor 21 and causing it to rotate in such a direction as to close work-engaging jaws 19 and 20 upon an object. When relay GC is energized, it also opens contact GC4 which will prevent inadvertent energization of contactor coil GO while relay GC is energized.

In accordance with the invention, means are provided to sense when the jaws 19 and 20 have tightly engaged an object therebetween and when the motor is stalled.

A stall relay SR is provided in line 62. Relay SR controls contact SR1. Relay SR is of a type which will not be energized by a transient current as would appear when motor 21 is first started. However, relay SR will become energized when the motor draws a large predetermined substantially steady state current as would occur upon stalling thereof. When relay SR is energized, contact SR1 is picked up, thereby connecting relay TR across lines 64 and 65 and energizing relay TR. When relay TR is energized, it closes contacts TR1 and TR2 and opens contacts TR4 and TR3. Opening of contact TR4 de-energizes relay GC thereby causing contacts GC1, GC2 and GC3 to open and isolate motor 21 from the line. When contact GC2 is opened, relay SR will become de-energized and contact SR1 will be opened.

When contact SR1 was closed, a circuit was established from line 64 to line 65 through line 69 and visual indicating lamp 67, which indicates to the operator that the grapple motor 21 has stalled and the load is positively engaged and may be hoisted. In the illustrated circuit indicating lamp 67 will remain energized so long as switch GCS is closed, inasmuch as a circuit is established therethrough through switch GCS and contact TR2. This gives the operator a positive indication that an object is engaged and is ready to be hoisted. Therefore, the operator does not have to depend upon detection of slippage of a clutch to determine that the load is engaged.

When the load is positively engaged it may then be hoisted and moved to a new location and set down. When the load is set down the grapple may be released from the load by depressing switch GOS. When switch GOS is closed, grapple open relay GO is energized through normally closed contactors GC4 and TR3. When relay GO is energized contactors GO1, GO2 and GO3 in line 61, 62 and 63, respectively, are closed thereby connecting motor 21 to a source of electric power. When relay GO is energized, it also opens normally closed contact GO4 which prevents inadvertent energizing of relay GC. When the motor is operated to open jaws 19 and 20, they will extend until pin 51 in slot 50 prevents further movement of arm 13 at which time motor 21 will stall when the jaws are in the full open position. Stall relay SR will detect the stall current and become energized closing contact SR1 allowing relay TR to become energized. When relay TR is energized, it will close contacts TR1 and TR2 and open contacts TR3 and TR4. Opening of contact TR3 will de-energize contactor coil GO which opens contacts GO1, GO2 and GO3. Also, visual indicating lamp 67 will be energized through closed contact TR1 and switch GOS to give the operator a visual indication that the load has been released and the grapple may be hoisted.

It may be noted in the illustrated embodiment of the control circuit that the visual indicating lamp 67 will only remain lit so long as either grapple close switch GCS or grapple open switch GOS is closed. However, if it should be desired for the lamp 67 to continuously remain lit when the motor 21 has stalled, a latching relay and switch therefor may be inserted in series with each of switches GCS and GOS and control a contact bridging these switch terminals. In such an arrangement a circuit would be established through indicating lamp 67 whenever relay TR was energized.

While a particular circuit has been illustrated and described to accomplish the objects of the invention, various modifications thereto as well as other circuit arrangements may be utilized. Obviously, a direct current motor together with appropriate circuitry and circuit elements might be used instead of the illustrated induction motor.

The invention is particularly useful where one operator is controlling a plurality of grapples. In such circumstances, the operator does not have to visually inspect each grapple to ensure that it is engaging its load inasmuch as an automatic indication is provided when the grapples have engaged their loads. It will be understood that indications other than visual may be provided. For example, the lamp 67 may be replaced with a buzzer.

From the foregoing it may be seen that the objects of the invention set forth as well as those made apparent from the foregoing description are efficiently accomplished. The invention for purposes of disclosure has been described in a preferred embodiment thereof. However, other embodiments of the invention as well as modifications to the disclosed embodiment may occur to those skilled in the art which do not depart from the spirit and scope of the invention. Accordingly, it is intended to cover in the appended claims, all modifications, and embodiments of the invention which do not depart from the spirit and scope of the invention.

What is claimed is:

1. A grapple comprising a pair of work-engaging jaws, an electric motor drivingly connected to move said jaws towards each other to engage an object therebetween and away from each other to open said jaws, said motor having terminals connectable to a source of electric power, means for controlling the direction of rotation of said motor to control opening and closing of said jaws, means for limiting outward movement of said jaws, a relay in circuit with said motor, said relay being effective to sense when said jaws engage an object and when outward movement of said jaws has been limited by sensing stalling of said motor, and circuit means responsive to sensing of stalling of said motor for interrupting electric power to said motor.

2. A grapple comprising a housing member, a pair of grapple arms movable in said housing in opposite directions, work-engaging jaws depending from the end of each of said arms, an electric motor supported on said grapple, said motor being drivingly connected to said grapple arms to move said jaws toward and away from each other to engage and release objects therebetween, means for limiting outward movement of said arms, circuit means for connecting said motor to a source of electric power, said circuit means including relay controlled contacts for reversing said motor and a stall relay for sensing stalling current of said motor, and a motor control circuit including relays for selectively closing said contacts when energized to control direction of rotation of said motor and direction of movement of said jaws, said stall relay being effective upon sensing motor stalling current when said jaws engage an object and when outward movement of said arms has been limited to de-energize said contact controlling relays and isolate said motor from the source of electric power.

3. The grapple of claim 2 including means for indicating that said motor has stalled.

4. A grapple comprising a housing member, a pair of grapple arms movable in said housing in opposite directions, work-engaging jaws depending from the end of each of said arms, an electric motor supported on said grapple drivingly connected to a pinion, racks on said grapple arms engaging opposite sides of said pinion, means limiting outward movement of one of said arms, circuit means for connecting said motor to a source of electric power, said circuit means including contacts for reversing said motor and a stall relay for sensing stalling current of said motor when said jaws engage an object therebetween and outward movement of said arms has been limited, and a motor control circuit including relay means for selectively controlling said contacts to control direction of rotation of said motor and direction of movement of said jaws, said stall relay being effective upon sensing motor stalling current to de-energize said relay means and isolate said motor from the source of electric power.

5. The grapple of claim 4 including means responsive to sensing of stalling current to visually indicate stalling of said motor.

6. A grapple comprising a pair of work-engaging jaws, an electric motor drivingly connected to move said jaws towards each other to engage an object therebetween and away from each other to open said jaws, said motor having terminals connectable to a source of electric power, means for controlling the direction of rotation of said motor to control opening and closing of said jaws, means for limiting outward movement of said jaws, a relay in circuit with said motor, said relay being effective to sense when said jaws engage an object and when outward movement of said jaws has been limited by sensing stalling of said motor, circuit means responsive to sensing of stalling of said motor for interrupting electric power to said motor, and means responsive to interruption of power to said motor upon stalling thereof for visually indicating that said motor has stalled.

References Cited by the Examiner

UNITED STATES PATENTS

| | | | |
|---|---|---|---|
| 2,390,293 | 12/45 | Colson | 294—86 |
| 2,420,855 | 5/47 | Bogart | 318—476 X |
| 2,611,888 | 9/52 | Richards | 318—469 X |
| 2,695,809 | 11/54 | Hooker | 294—88 X |
| 2,760,138 | 8/56 | Colby. | |

GERALD M. FORLENZA, *Primary Examiner.*

ERNEST A. FULLER, SAMUEL F. COLEMAN,
*Examiners.*